US008289692B2

(12) United States Patent
Franz et al.

(10) Patent No.: US 8,289,692 B2
(45) Date of Patent: Oct. 16, 2012

(54) BLADE SERVER FOR INCREASED PROCESSING CAPACITY

(75) Inventors: John P. Franz, Houston, TX (US); John D. Nguyen, Cypress, TX (US); Jon Kolas, Tomball, TX (US); Curt S. Belusar, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

(21) Appl. No.: 12/922,411

(22) PCT Filed: Mar. 14, 2008

(86) PCT No.: PCT/US2008/057069
§ 371 (c)(1),
(2), (4) Date: Sep. 13, 2010

(87) PCT Pub. No.: WO2009/114018
PCT Pub. Date: Sep. 17, 2009

(65) Prior Publication Data
US 2011/0007473 A1 Jan. 13, 2011

(51) Int. Cl.
*G06F 1/16* (2006.01)
(52) U.S. Cl. .................... 361/679.33; 439/377; 165/247; 257/690
(58) Field of Classification Search .................. 439/65, 439/95, 637, 135, 260, 377, 607.5; 165/104.33, 165/104.13, 80.4, 104.31, 247, 288, 80.2, 165/67; 361/679.33, 679.02, 679.53, 679.48, 361/679.32, 679.4, 679.37, 679.46, 679.47, 361/679.54, 752, 698, 700, 807; 365/189.05, 365/230.03; 257/686, 690, 700, 706
See application file for complete search history.

(56) References Cited

U.S. PATENT DOCUMENTS

| 6,935,868 B1 | 8/2005 | Campini et al. |
| 7,042,734 B2 | 5/2006 | Hensley et al. |
| 2008/0080149 A1* | 4/2008 | Hanna et al. ............. 361/752 |
| 2011/0261526 A1* | 10/2011 | Atkins et al. ........... 361/679.33 |

FOREIGN PATENT DOCUMENTS

CN 1423917 6/2003

OTHER PUBLICATIONS

Kevin Leigh,et.al, "General-Purpose Blade Infrastructure for Configurable System Architecutres" Distributed and Parallel Databases, Springer, Jun. 2007, 30 pages.
Kevin Leigh,et.al, "Blades as a General-Purpose Infrastructure for Future System Architectures: Challenges and Solutions" HP Labs technical report HPL-2006-182, Jan. 2007, 12 p.

* cited by examiner

Primary Examiner — Hung Duong

(57) ABSTRACT

A blade server for increasing the amount of processing capacity per rack bay is disclosed. The blade server includes a housing having a top portion and a bottom portion, a first printed circuit assembly adjacent to the top portion of the housing, a second printed circuit assembly positioned in the bottom portion of the housing opposite the first printed circuit assembly, and a connector attaching the first and second printed circuit assembly to one another.

24 Claims, 15 Drawing Sheets

BLADE SERVER FOR INCREASED PROCESSING CAPACITY

BACKGROUND

New computer processing systems require a more specialized product that optimizes space while packing in the most processors per "U" of a rack (1U=1.75 inches). Current blade servers can support approximately 120-190 CPUs per rack. Due to structural restrictions, current blade servers are unable to provide the extra processing capacity needed by the new processing systems. For example, current servers are incapable of supporting full height memory in a vertical orientation on a one system board. This limits memory capacity and increases customer costs since low profile memory provides less memory capacity at a greater cost.

Current servers have four CPUs in 1U rack mount servers. These 1U servers require, among other things, power supplies, banks of small fans, IO ports, and cable management equipment that limit cooling and power capacity as well as resulting in problems associated with, among other things, noise and structural issues, exhaust venting problems, and cabling problems.

Current servers (rack mount and/or blade style) are more "general purpose" and have arranged the electrical and mechanical features around more traditional configurations to balance cost, performance, serviceability and availability. By following the status quo of using only one system board in an enclosure the current marketplace is not able to provide operators the processing capacity they need. In addition, current solution rack mount servers are constrained by thermal, power, and cabling concerns that prevent them from being able to double the density within the enclosure. Therefore, current 1U servers and blades do not achieve the necessary density to solve the needs of the marketplace in data centers that have already been built. The latest processors per rack and the entire 1U server are packed. Thus, in order to compete with other servers and blade systems, it is necessary to increase CPU sockets per enclosure bay and bring cost metrics down and performance metrics up. It is for these reasons, that a device that allowed for increasing the processor per rack U-ratio would be an important improvement in the art.

DETAILED DESCRIPTION OF THE EMBODIMENTS

Figure 1:
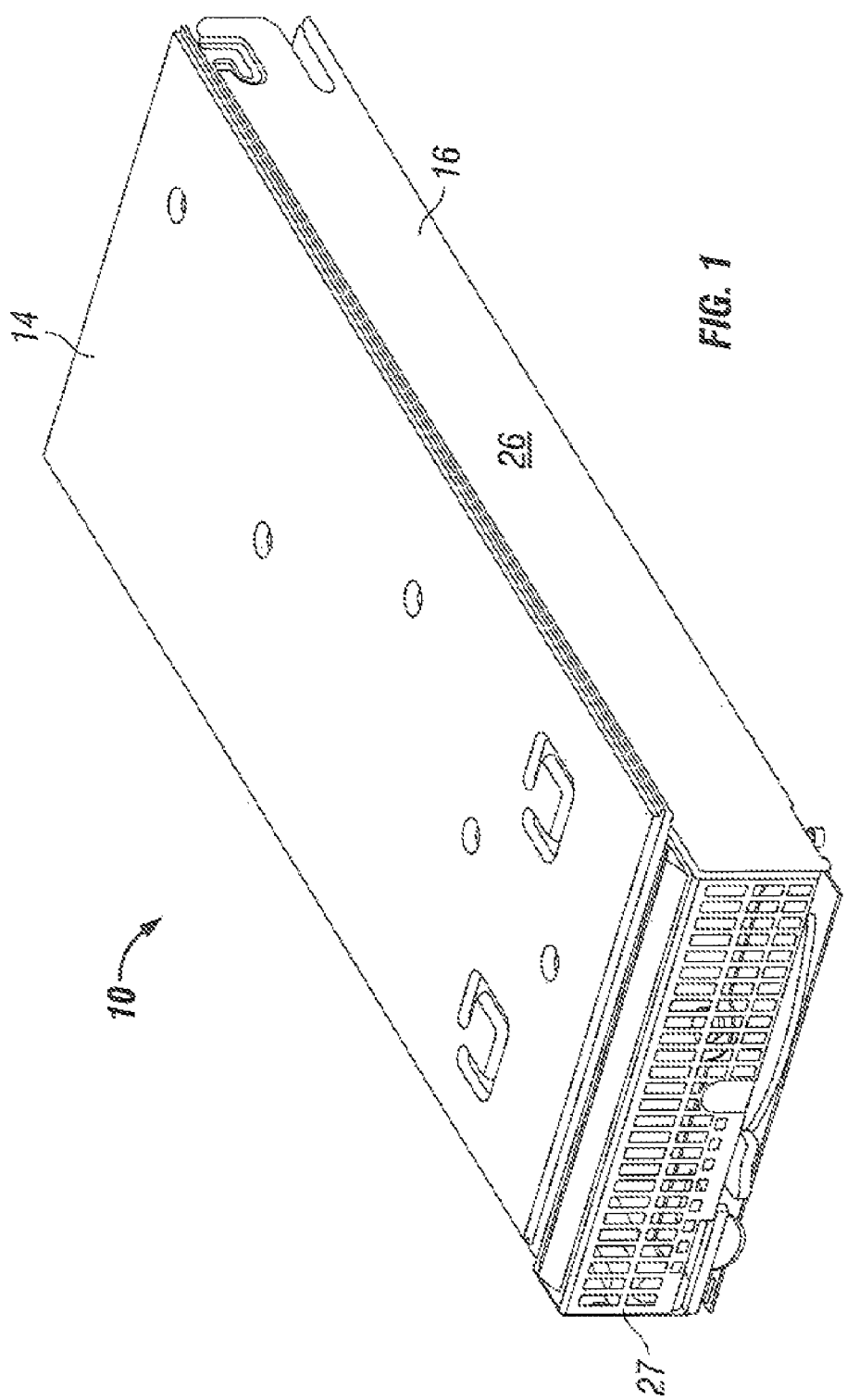
FIG. 1 is a perspective view of a blade server.
Figure 2:
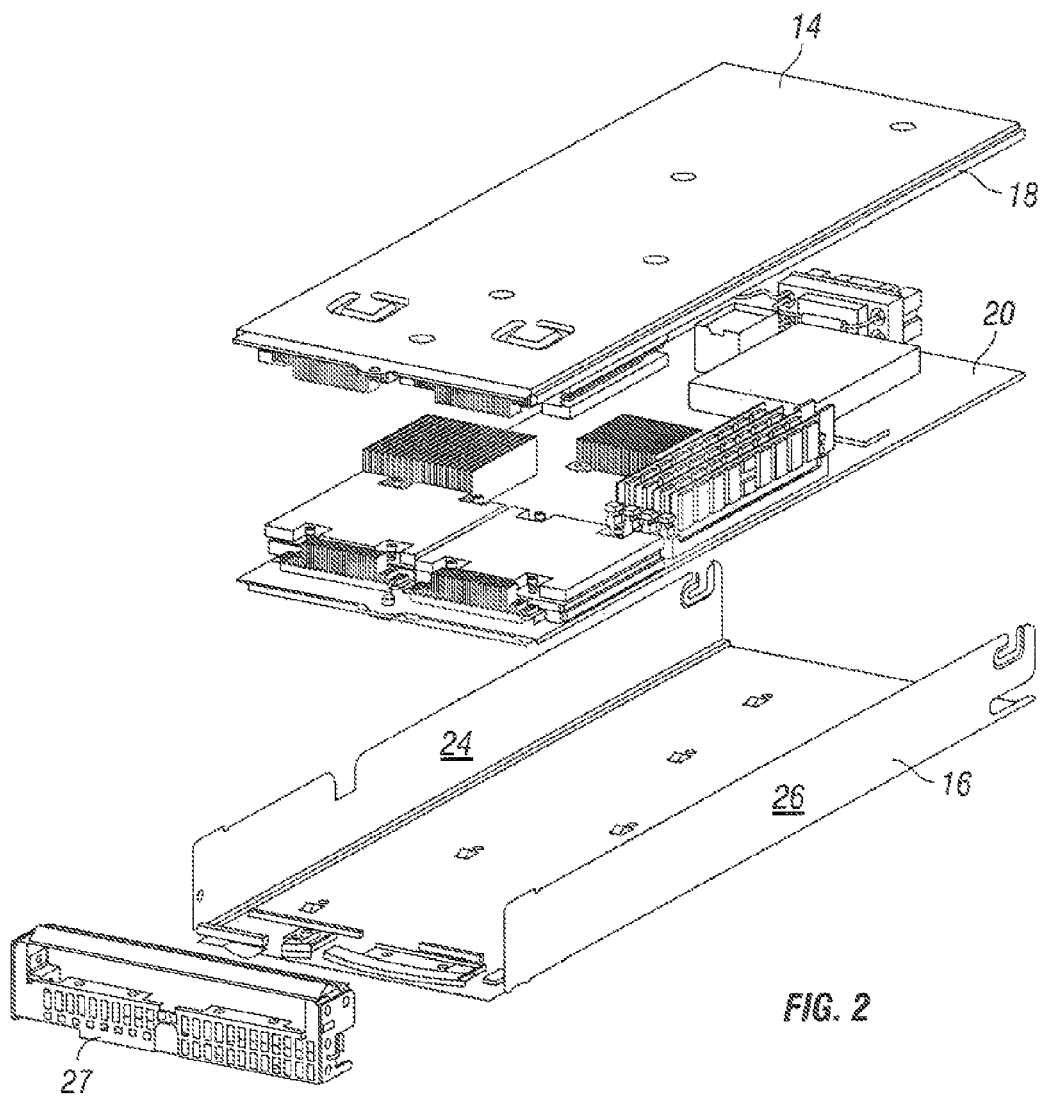
FIG. 2 is an exploded view of a blade server.
Figure 7:
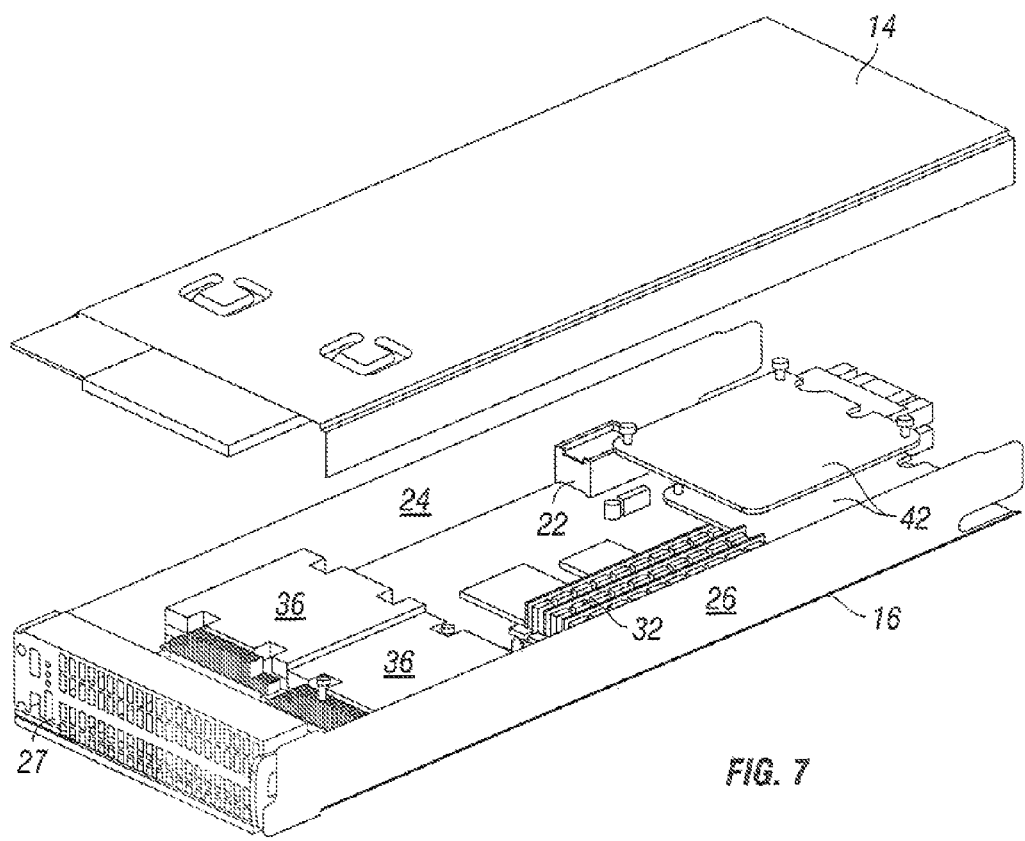
FIG. 7 is an exploded view of a blade server.

The apparatus involves a way of providing increased processing capacity. An embodiment relates to a blade server 10 for increasing the amount of processing capacity per rack bay (not shown), as shown in FIGS. 1, 2 and 7. The blade server 10 comprises a housing 12 having a top portion 14 and a bottom portion 16. As shown in FIG. 2, a first printed circuit assembly 18 is adjacent to the top portion 14 of the housing 12 while a second printed circuit assembly 20 is positioned in the bottom portion 16 of the housing 12 opposite the first printed circuit assembly 18. The printed circuit assemblies 18, 20 are half height models that are joined together with a pass through connector 22 so that the top system 18 can share a connector 22 to transfer power and signals to the housing 12 backplane. In an embodiment, the housing 12 has a thickness of approximately 2.025 inches.

In the embodiment shown in FIGS. 2, 3C, 4C, and 7, the bottom portion 16 of the housing 12 includes a first side 24 and a second side 26 opposite the first side 24. These first and second sides 24, 26 are approximately perpendicular to the top and bottom portions of the housing 14, 16. As shown in FIGS. 1, 2, 3D, 4C, 5, and 7, a bezel 27 may be used to enclose the front portion of the housing 12.

Figure 3A:
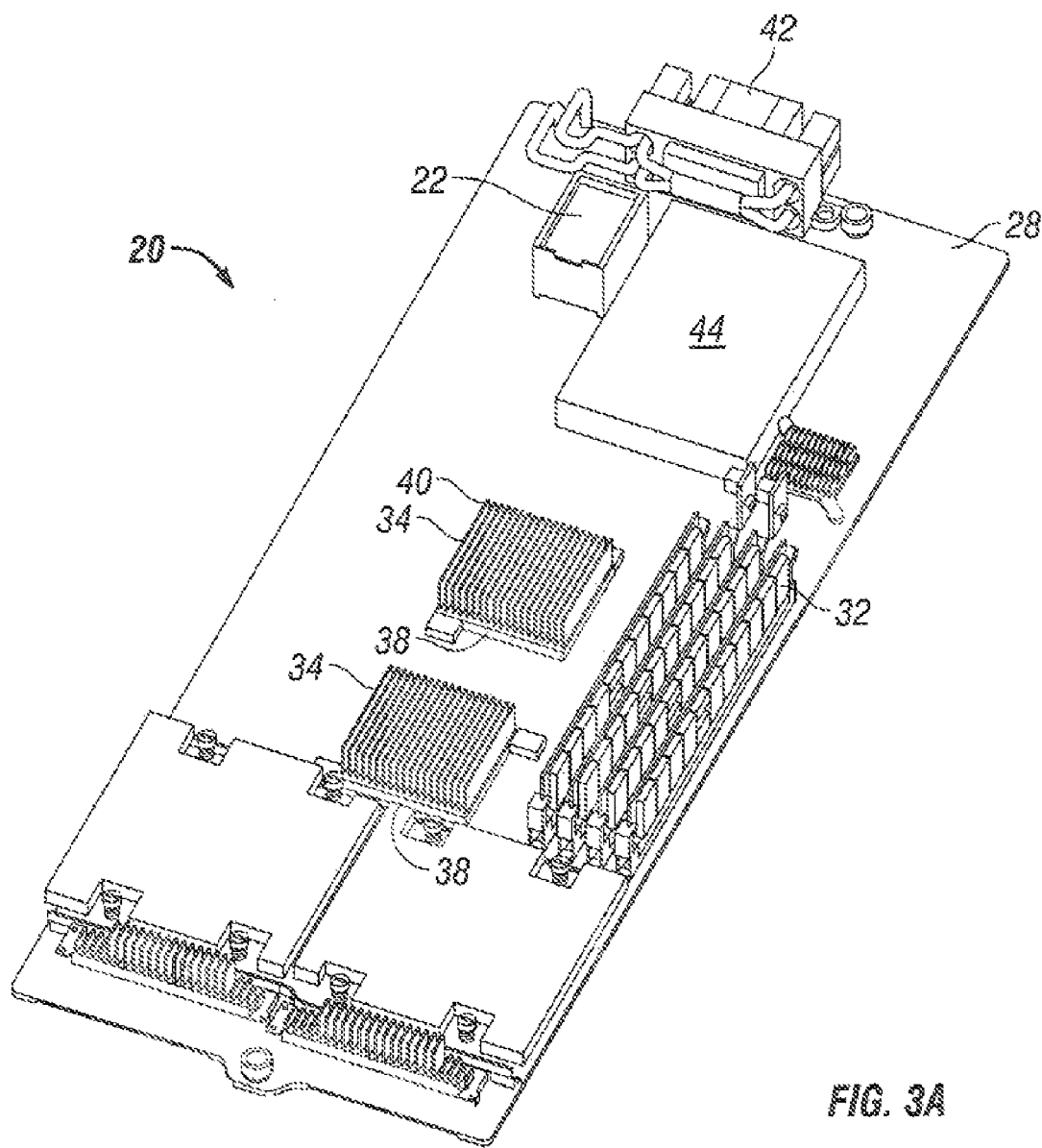
FIG. 3A is a perspective view of a second printed circuit assembly.
Figure 3B:
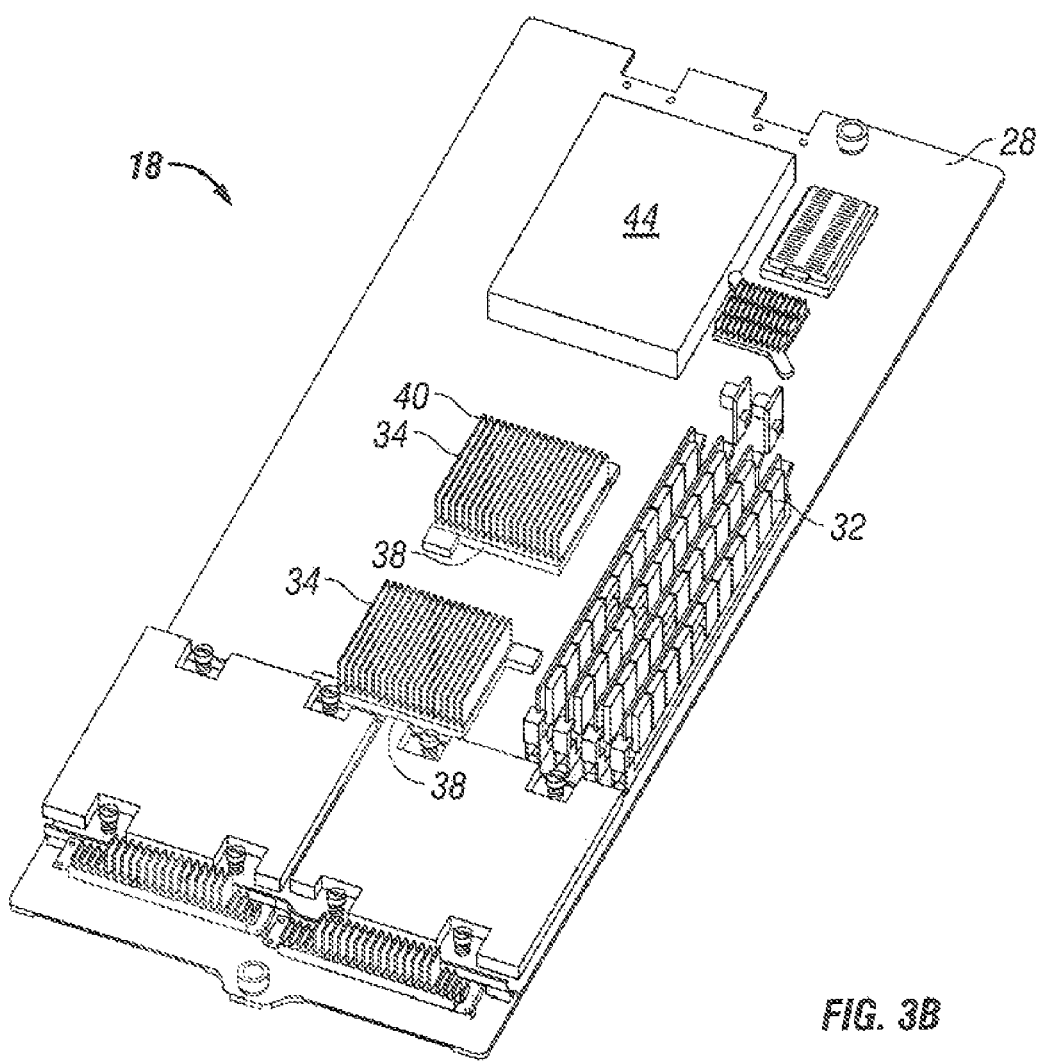
FIG. 3B is a perspective view of a first printed circuit assembly.
Figure 3C:
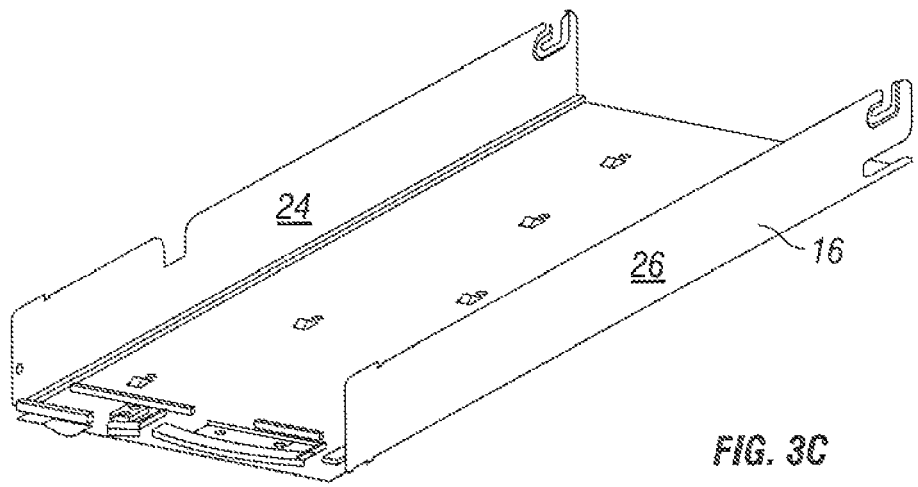
FIG. 3C is a perspective of a bottom portion of a housing.
Figure 3D:
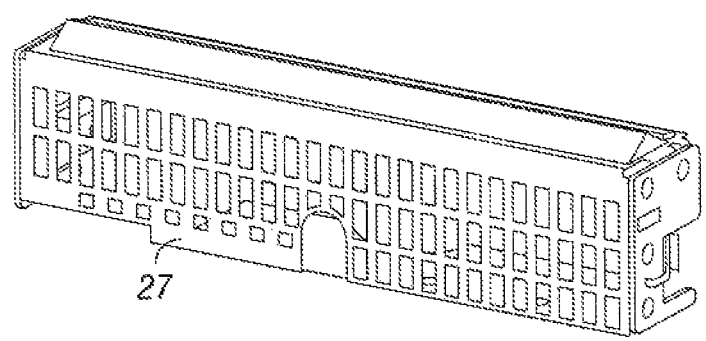
FIG. 3D is a perspective of a front portion of a housing.
Figure 4A:
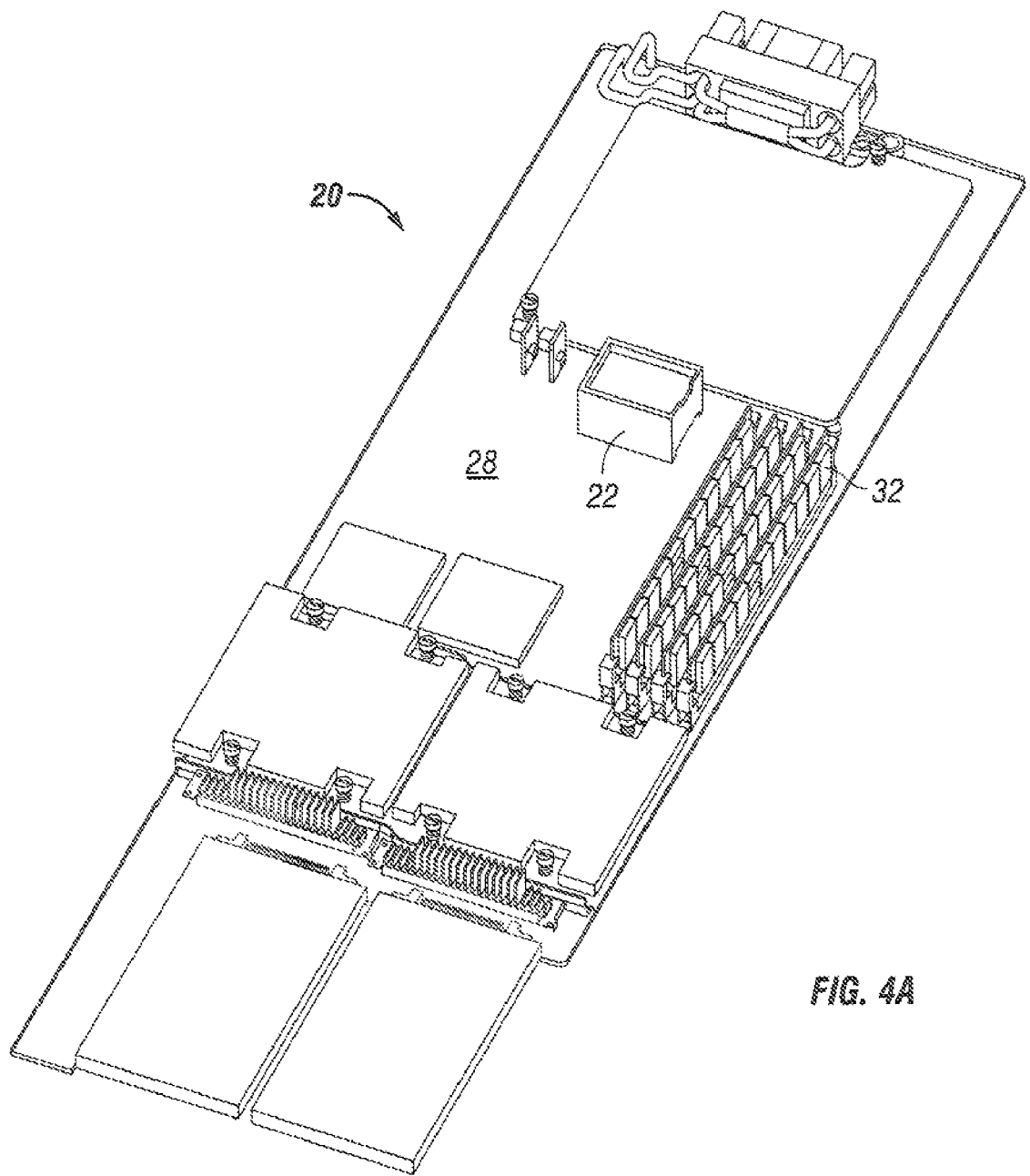
FIG. 4A is a perspective view of a second printed circuit assembly.
Figure 4B:
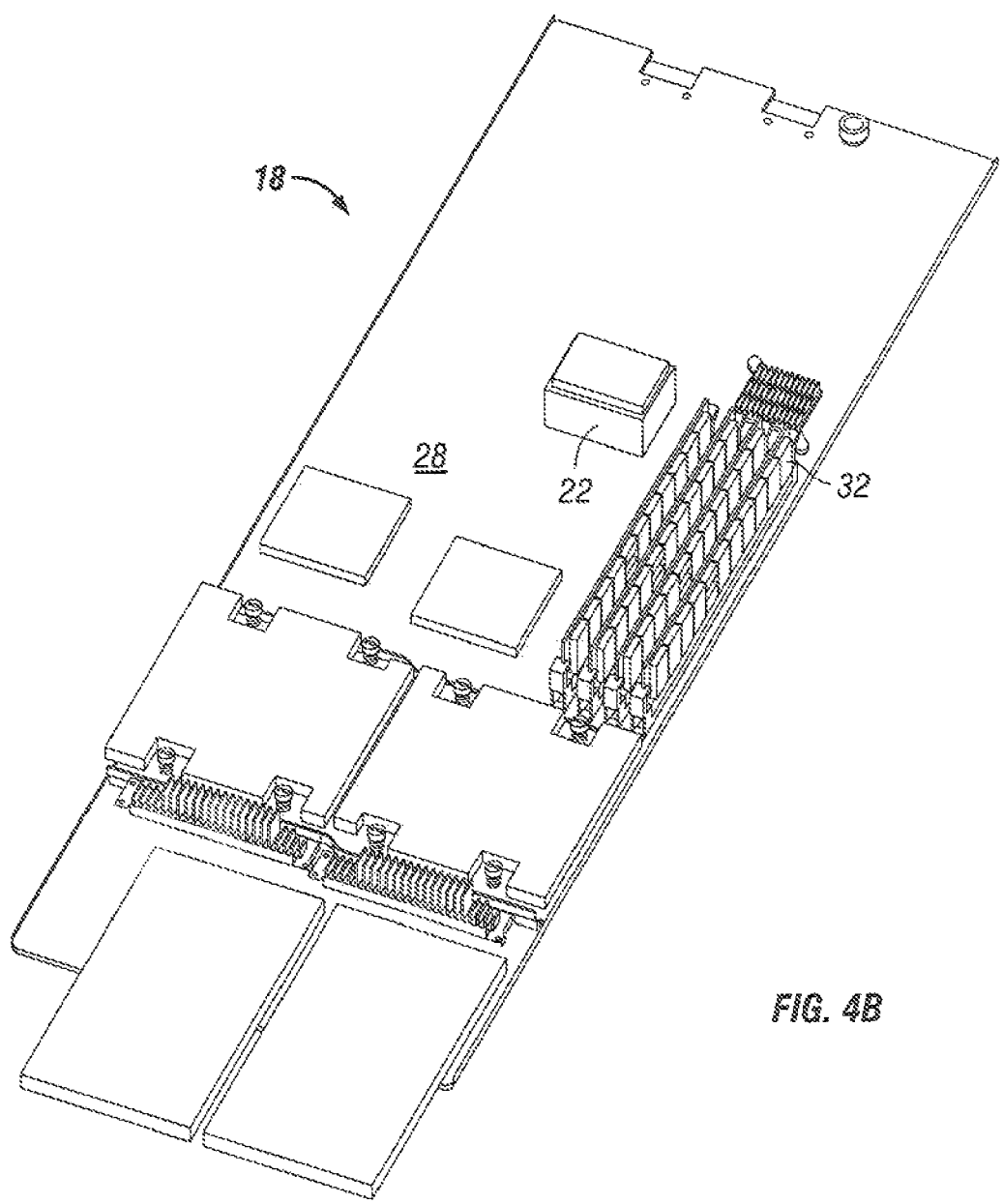
FIG. 4B is a perspective view of a first printed circuit assembly.
Figure 4C:
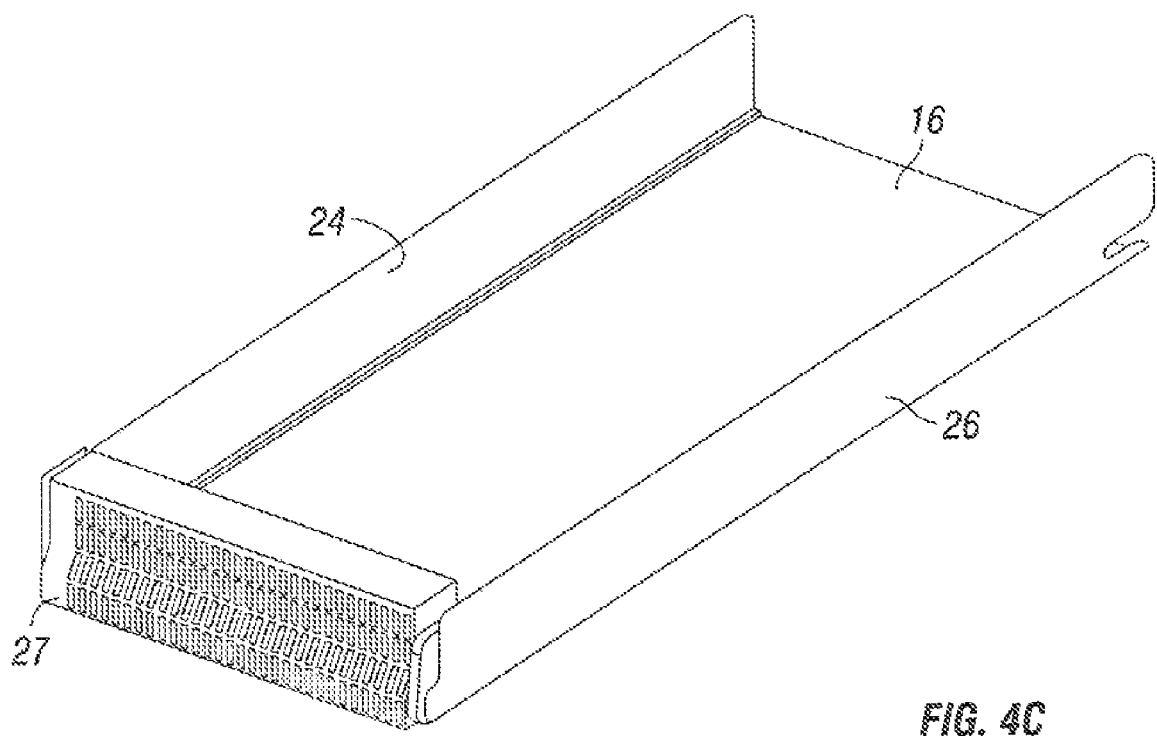
FIG. 4C is a perspective view of a bottom portion of a housing.
Figure 5:
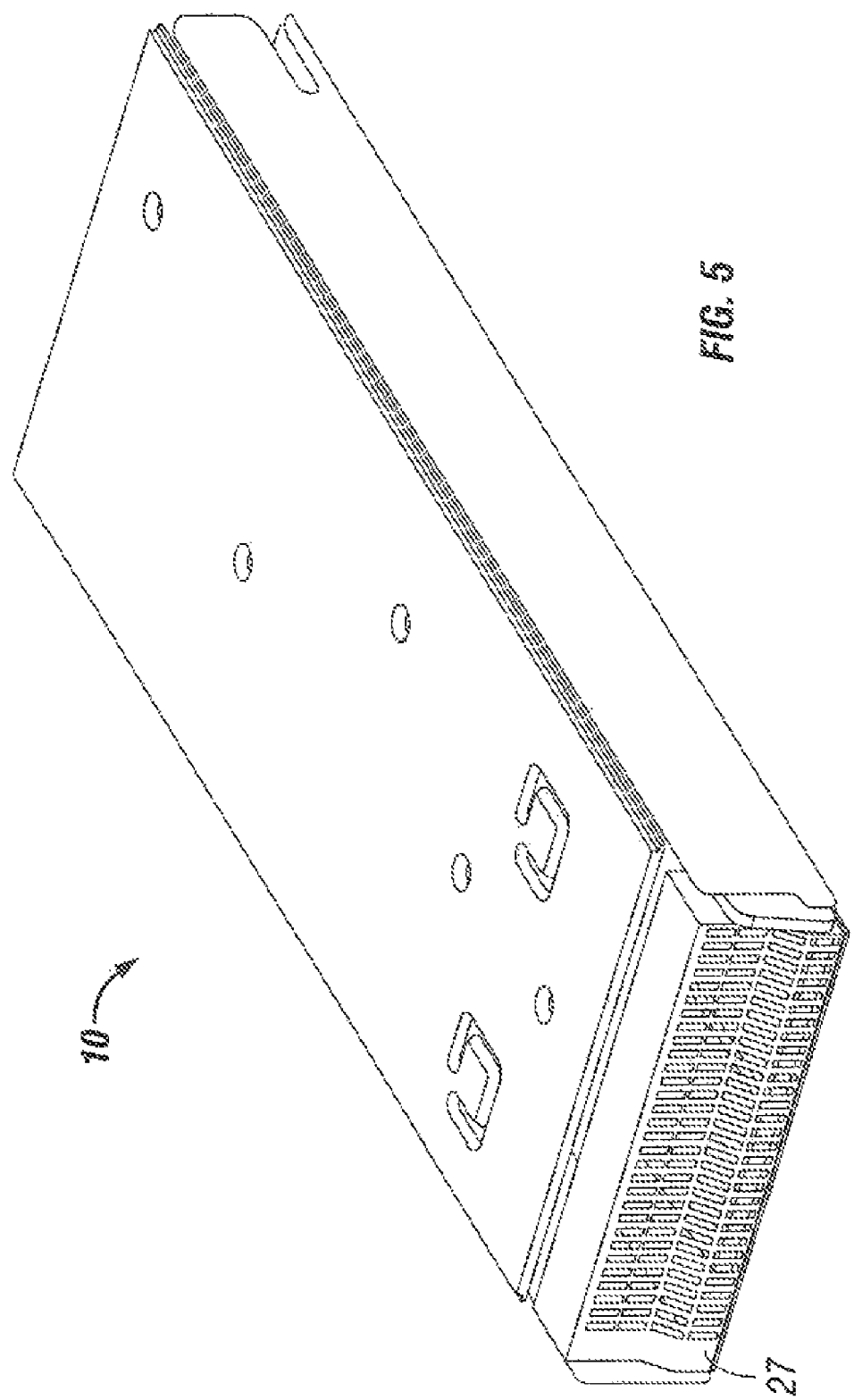
FIG. 5 is a perspective view of a blade server.
Figure 6A:
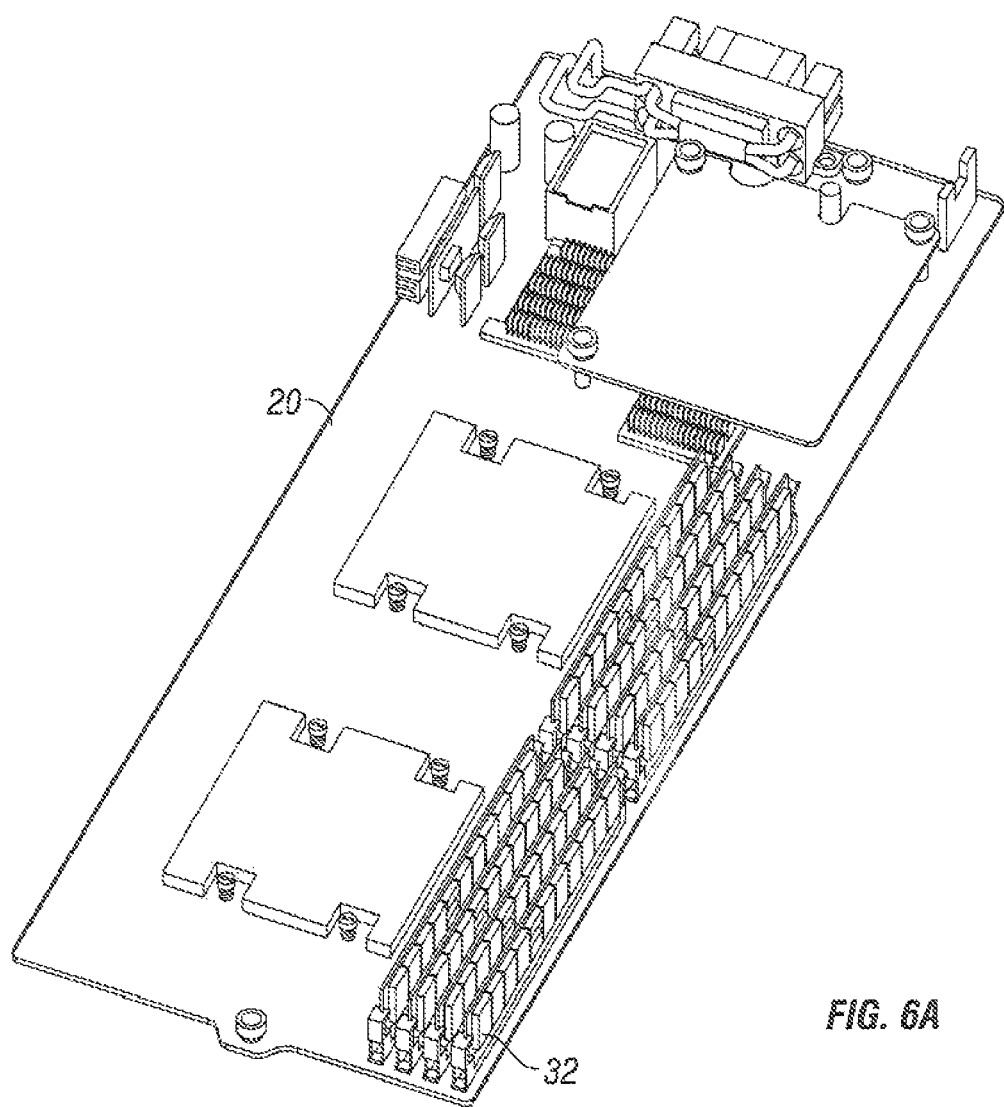
FIG. 6A is a perspective view of a second printed circuit assembly.
Figure 6B:
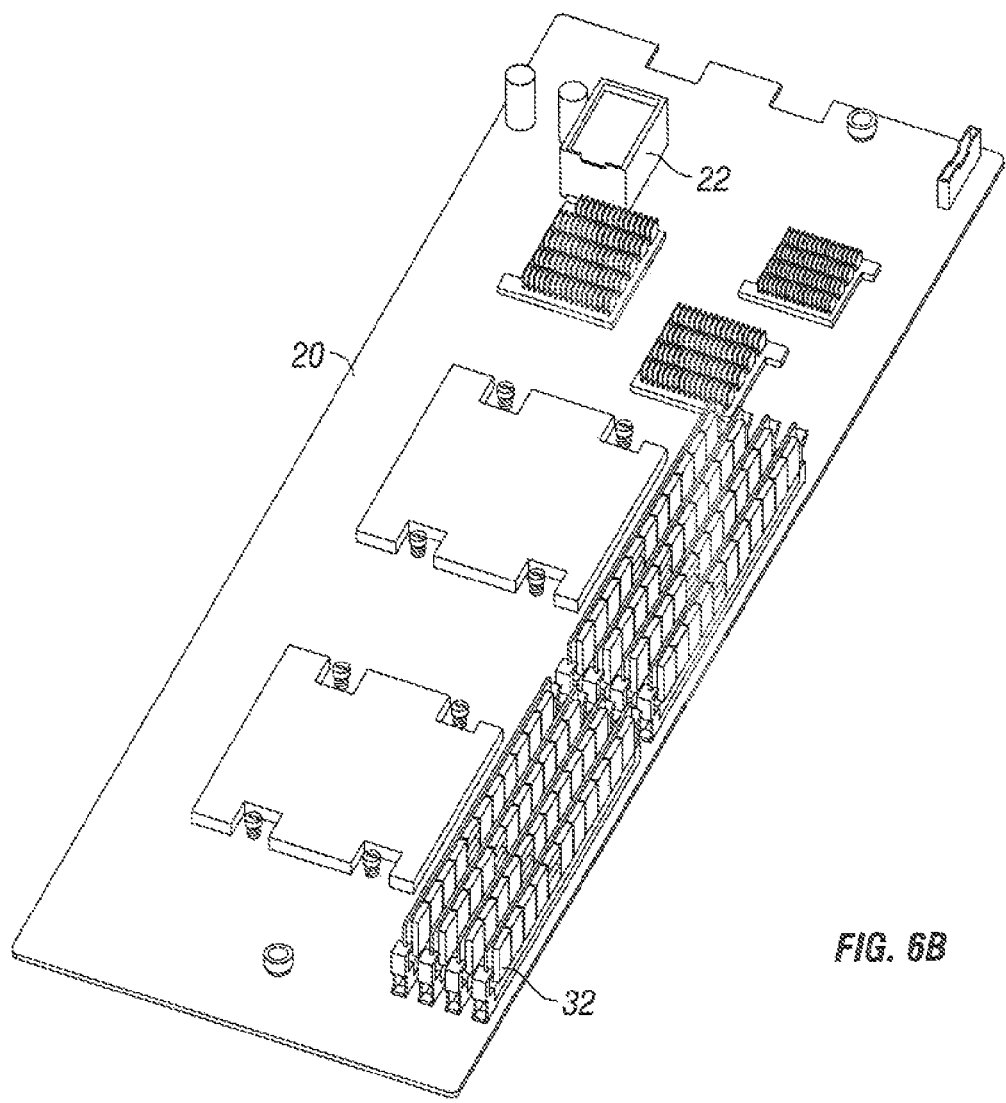
FIG. 6B is a perspective view of a first printed circuit assembly.
Figure 8:
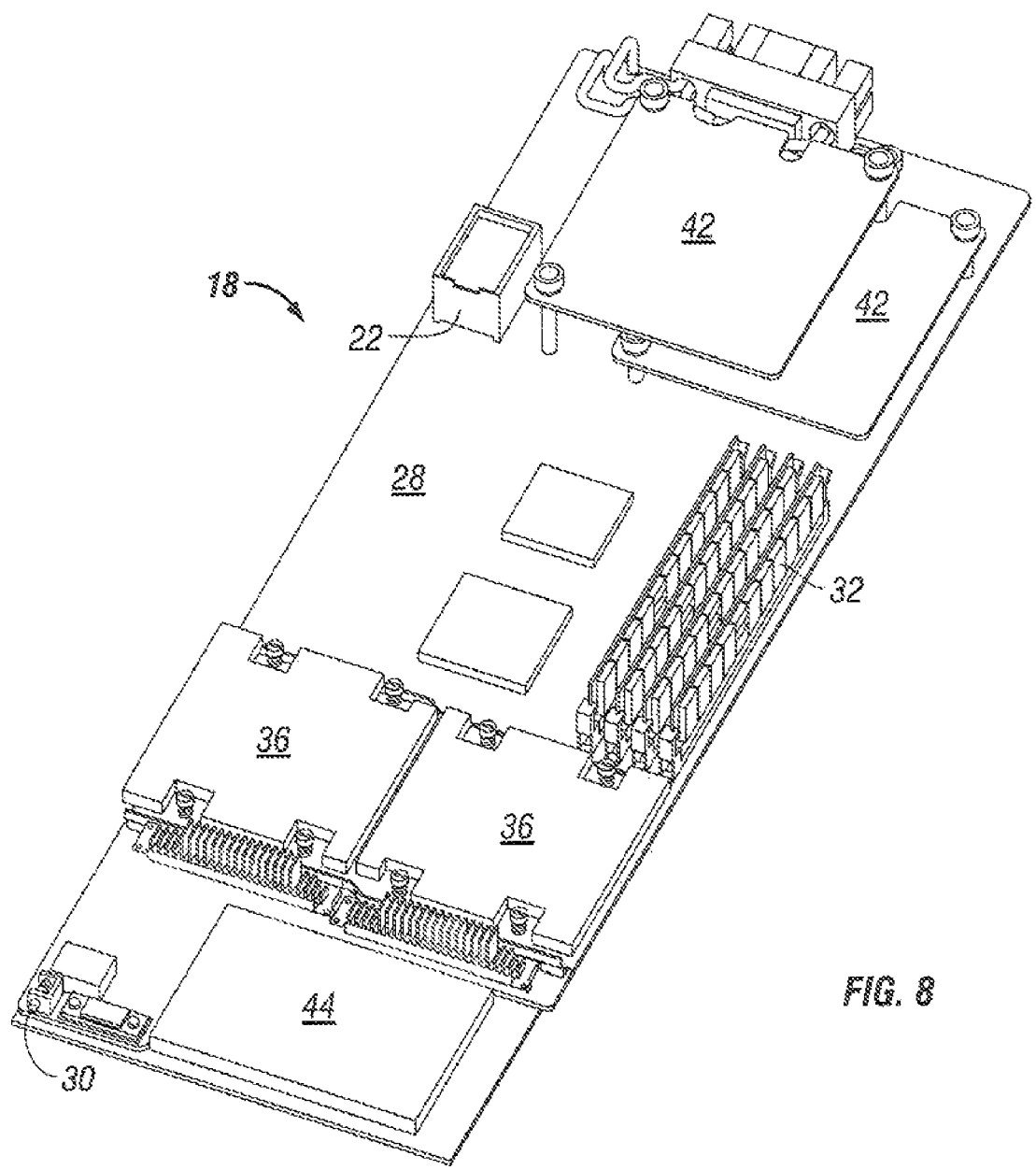
FIG. 8 is a perspective view of a first printed circuit assembly.
Figure 9:
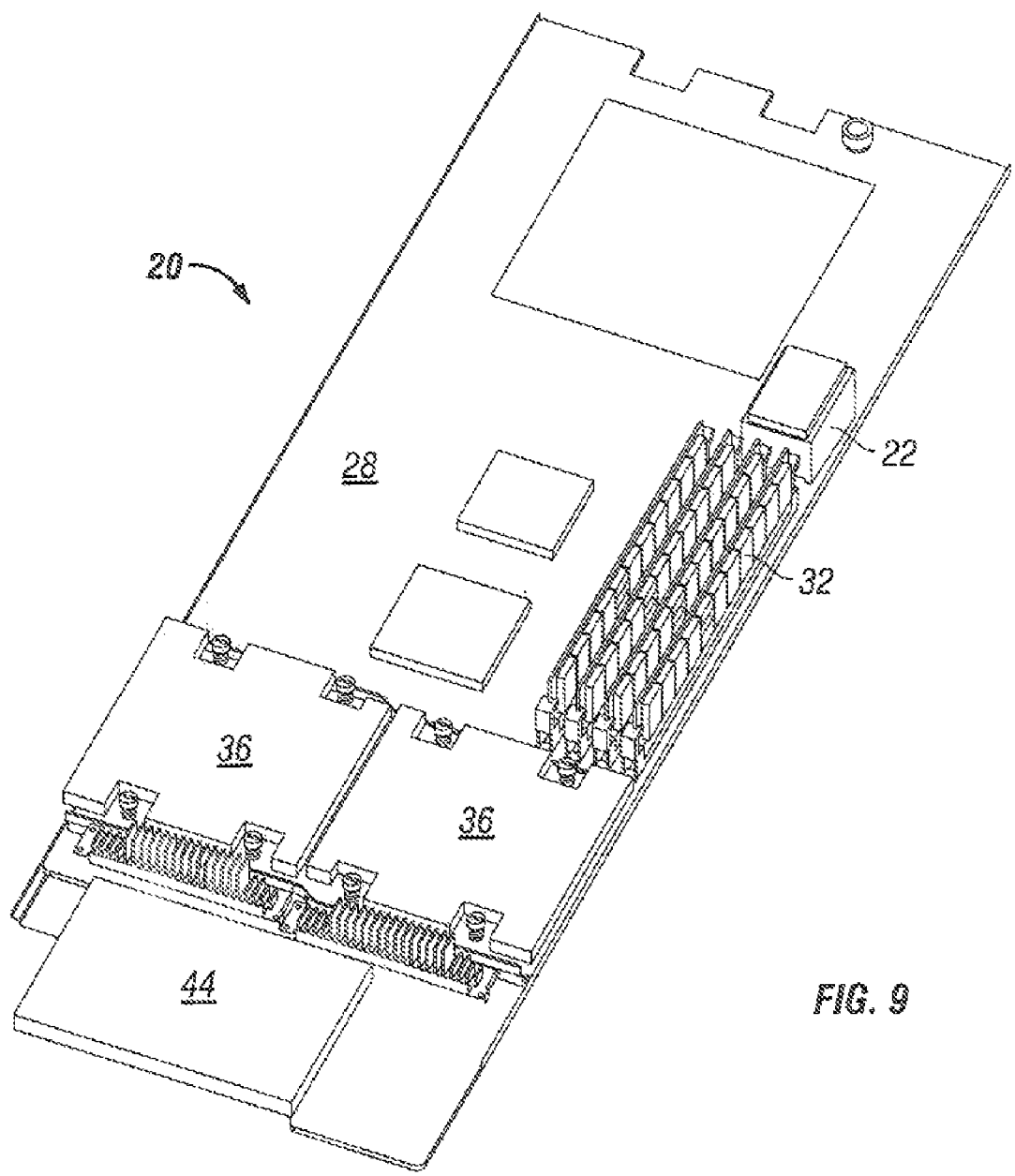
FIG. 9 is a perspective view of a second printed circuit assembly.

In another embodiment, the first and second printed circuit assembly 18, 20 each included printed circuit boards 28 which are separated from each other by a distance of approximately 38 mm. These boards 28 may each include a power switch 30, as shown in FIG. 8. In this embodiment, as shown in FIGS. 3A-B, a memory component 32 may be mounted on each of the first and second printed circuit boards 28. These memory components 32 may be vertical with respect to the printed circuit board 28 and have a height of approximately 1.3 inches. In a more particular version of the embodiment, the vertical memory components 32 may have a height less than 1.3 inches and, in particular, approximately 0.75 inches. In a still more particular version of the embodiment, each of the vertical memory components 32 are spaced side-by-side when the first and second printed circuit assemblies 18, 20 are positioned in the housing 12, as shown in FIGS. 2 and 7. In a still more particular version of this embodiment, each of the vertical memory components 32 is interleaved with one another when the first and second printed circuit assemblies 18, 20 are positioned in the housing 12.

In another embodiment, the memory component 32 may be angled from the vertical with respect to the printed circuit board 28. In a more particular version of the embodiment, the memory component 32 may be angled approximately 25° with respect to the printed circuit board 28.

As shown in FIGS. 3A and B, each of the printed circuit assembly 18, 20 includes a processor (not shown) located under a heat sink 34. The heat sink 34 on each processor may oppose each other when the processors are positioned in the housing 12. The processor heat sinks 34 are similar to the chip heat sink 36 in that they may include a base structure 38 and a plurality of fin surfaces 40 extending from the base structure 38. In such an embodiment, the base structure 38 has a height of approximately 2-3 mm and the fin surfaces 40 have a height of approximately 7.5 mm. FIGS. 4A-C, 5, 6A-B, 8 and 9, show different embodiments of the printed circuit assembly 18 that may be used in the double-density blade server 10.

In still another embodiment, both the first and the second printed circuit assemblies 18, 20 include a mezzanine card option 42, as shown in FIG. 3A, to allow connection with a switch bay. At least one hard drive 44 is also connected to each one of the first and the second printed circuit assemblies 18, 20. Each printed circuit board 28 will also include separate power buttons, a diagnostic connector and LEDs, and internal USB support.

The double-density blade server 10, as shown in FIGS. 1, 2, 5, and 7, is compatible with electrical and software functionality used in current blade systems. Each blade server 10 is similar architecturally with respect to CPU, memory and chipset layout. The blade server 10, however, has several differences that require an "A" and "B" printed circuit board 28. For example, the lower "A" board may contain both blades' mezzanine connectors 42, power and signal connectors for backplane connection, as shown in FIG. 3A. It is preferred to place all backplane connectors on a single board to reduce connector count which may degrade signal speed. Furthermore, the lower board will have one half of an "umbilical" connector 22 for joining the upper board "B". The upper board "B", as shown in FIG. 3B, will have the mating half of the umbilical connector 22 as well, the upper board may include a large cut out relief to provide clearance for top IO mezzanine cards 42 that would be plugged into the lower board "A".

When in operation, the double-density blade server 10 allows for 16 servers per enclosure (not shown), 2 CPUs per printed circuit board 28, two printed circuit boards 28 per bay and four enclosures per rack (not shown), thus resulting in up to 256 CPUs per rack. This results in over a 50% increase in processing power over conventional blade systems.

The double-density blade server 10 disclosed herein with blade enclosure gives computer operators an increased processor density with no performance sacrifice. Combined with existing server blades, storage blades or external mass storage arrays, computer operators can get the most flexibility with setting up their data centers to customize and optimize between compute node and storage node rations to gain the best of whatever metric they choose (i.e., performance per watt, performance per dollar, or Megabyte per dollar).

The blade server 10 also involves a printed circuit assembly 18 for nesting with a second printed circuit assembly 20 within in a blade server 10. As shown in FIG. 3A, the printed circuit assembly 18 comprises a printed circuit board 28, a vertical memory component 32 having a height of approximately 1.5 inches mounted on the printed circuit board 28. A processor (not shown) is mounted on the printed circuit board 28 beneath a heat sink 34. The processor is interfaced with the vertical memory component 32 and has a heat sink 34 similar to the chip heat sink 36 having a base structure 38 with a height of approximately 2-3 mm and a plurality of fin surfaces 40 having a height of approximately 7.5 mm extending from the base structure 38. A mezzanine card option 42 is mounted on the board 28 and interfaced with the processor. A hard drive 44 interfaced with the processor and the vertical memory component 32 is also mounted on the printed circuit board 28.

In an embodiment, the second printed circuit assembly 20 is substantially similar to the first printed circuit assembly 18, as shown in FIG. 3B.

Figure 10:
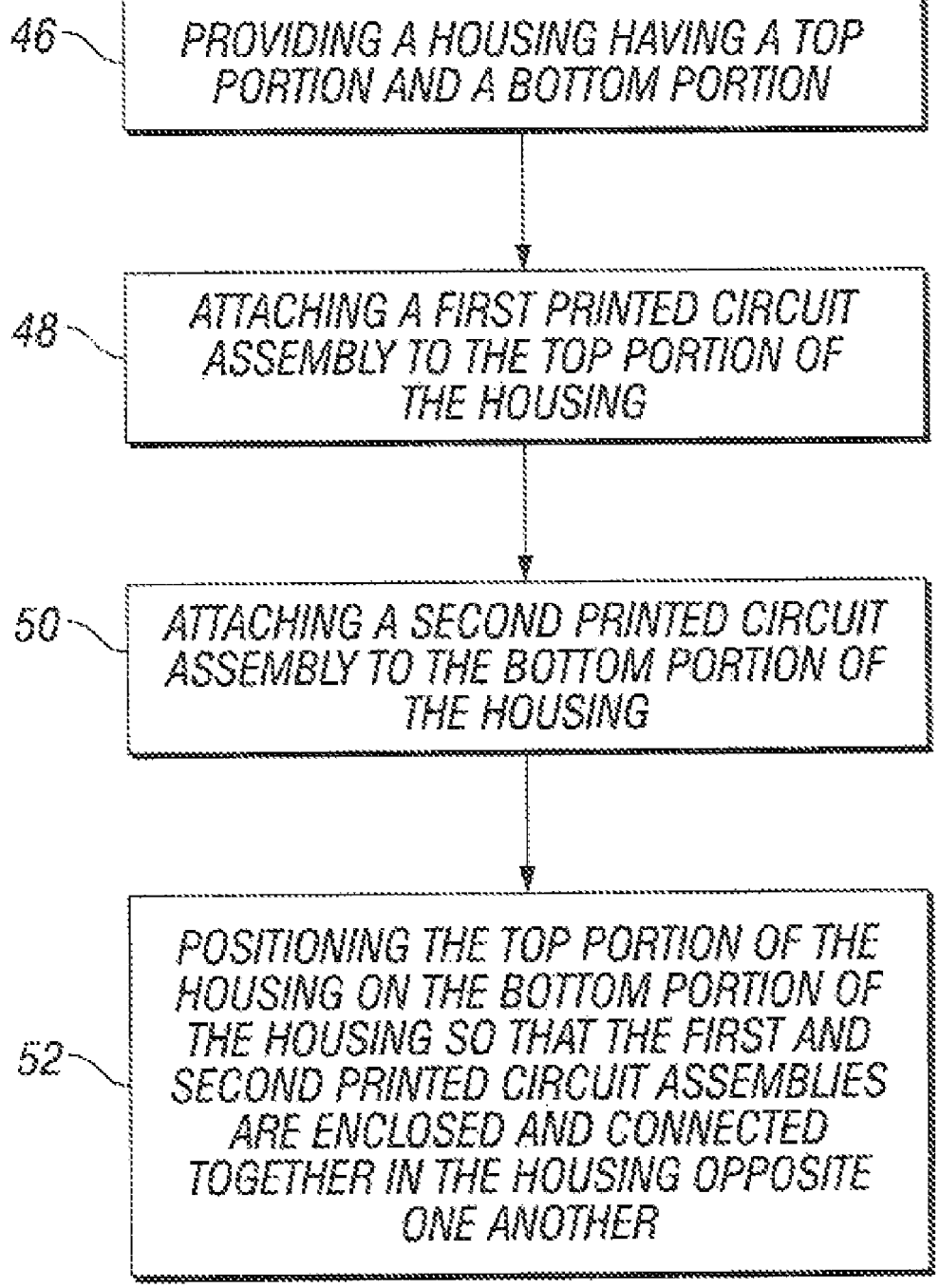
FIG. 10 is a flow chart showing a method for increasing the amount of processing capacity per rack.

A method of increasing the amount of processing capacity per rack bay is also disclosed. As shown in FIG. 10, the method comprises: (1) providing a housing having a top portion and a bottom portion 46; (2) attaching a first printed circuit assembly to the top portion of the housing 48; (3) attaching a second printed circuit assembly to the bottom portion of the housing 50; and (4) positioning the top portion of the housing on the bottom portion of the housing so that the first and second printed circuit assemblies are enclosed and connected together in the housing opposite one another 52.

In an embodiment of the method, the housing 12 is placed in a rack. In still another embodiment, the first and second printed circuit assemblies 18, 20 are positioned opposite one another.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the claimed apparatus, device, system or method (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed apparatus, device, system or method and does not impose a scope limitation unless otherwise claimed. No language in the specification should be construed as indicating any non-claimed element as essential to the practice of the claimed apparatus, device, system or method.

Preferred embodiments of the claimed apparatus, device, system or method are described herein, including the best mode known to the inventors for carrying out the claimed apparatus, device, system or method. It should be understood that the illustrated embodiments are exemplary only, and should not be taken as limiting the scope of the claimed apparatus, device, system or method.

What is claimed is:

1. A blade server for increasing the amount of processing capacity per rack bay, the blade server comprising:
   a housing having a top portion and a bottom portion;
   a first printed circuit assembly adjacent to the top portion of the housing;
   a second printed circuit assembly positioned in the bottom portion of the housing opposite the first printed circuit assembly; and
   a connector attaching the first and second printed circuit assembly to one another.

2. The blade server of claim 1, wherein the housing has a thickness of approximately 2.025 inches.

3. The blade server of claim 1, wherein:
   the bottom portion of the housing includes a first and a second side opposite the first side; and
   said first and second sides are approximately perpendicular to the bottom and top portions of the housing.

4. The blade server of claim 1, wherein:
   the first and second printed circuit assembly each included a printed circuit board; and
   the first and second printed circuit boards are separated from each other by a distance of approximately 38 mm.

5. The blade server of claim 4, wherein a memory component is mounted on each of the first and second printed circuit boards.

6. The blade server of claim 5, wherein the memory component is a vertical memory component having a height of approximately 1.3 inches.

7. The blade server of claim 6, wherein the vertical memory component has a height less than 1.3 inches.

8. The blade server of claim 6, wherein the vertical memory component has a height of approximately 0.75 inches.

9. The blade server of claim 4, wherein each of the printed circuit boards includes a power switch.

10. The blade server of claim 5, wherein each of the memory components are spaced side-by-side when the first and second printed circuit assemblies are positioned in the housing.

11. The blade server of claim 5, wherein each of the memory components are interleaved with one another when the first and second printed circuit assemblies are positioned in the housing.

12. The blade server of claim 5, wherein the memory component is angled from the vertical with respect to the printed circuit board.

13. The blade server of claim 12, wherein the memory component is angled approximately 25° with respect to the printed circuit board.

14. The blade server of claim 1, wherein:
each printed circuit assembly includes a processor; and
each processor includes a heat sink.

15. The blade server of claim 14, wherein the heat sink on each processor oppose each other when the processors are positioned in the housing.

16. The blade server of claim 14, wherein:
the heat sink has a base structure; and
a plurality of fin surfaces extend from the base structure.

17. The blade server of claim 16, wherein:
the base structure has a height of approximately 2-3 mm; and
the fin surfaces have a height of approximately 7.5 mm.

18. The blade server of claim 1, wherein both the first and the second printed circuit assemblies includes a standard mezzanine card option.

19. The blade server of claim 1, wherein at least one hard drive is connected to each one of the first and the second printed circuit assemblies.

20. A printed circuit assembly for nesting with a second printed circuit assembly within in a blade server, the printed circuit assembly comprising:
a printed circuit board;
a vertical memory component having a height of approximately 1.3 inches mounted on the printed circuit board;
a processor mounted on the printed circuit board and interfaced with the vertical memory component, said processor including a heat sink having a base structure with a height of approximately 2-3 mm and a plurality of fin surfaces having a height of approximately 7.5 mm extending from the base structure;
a mezzanine card option mounted on the board and interfaced with the processor; and
a hard drive mounted on the printed circuit board, said hard drive interfaced with the processor and the vertical memory component.

21. The printed circuit assembly of claim 20, wherein the second printed circuit assembly is substantially similar to the first printed circuit assembly.

22. A method of increasing the amount of processing capacity per rack bay, the method comprising:
providing a housing having a top portion and a bottom portion;
attaching a first printed circuit assembly to the top portion of the housing;
attaching a second printed circuit assembly to the bottom portion of the housing; and
positioning the top portion of the housing on the bottom portion of the housing so that the first and second printed circuit assemblies are enclosed and connected together in the housing opposite one another.

23. The method of claim 22 further comprising the step of placing the housing in a rack.

24. The method of claim 22, wherein the first and second printed circuit assemblies are positioned opposite one another.

* * * * *